United States Patent [19]

deNeufville et al.

[11] Patent Number: 4,624,902
[45] Date of Patent: Nov. 25, 1986

[54] COATINGS FOR ELECTROCHEMICAL ELECTRODES AND METHODS OF MAKING THE SAME

[75] Inventors: John P. deNeufville, Mendham; Dalbir Rajoria, Summerville, both of N.J.; Stanford R. Ovshinsky, Bloomfield Hills, Mich.

[73] Assignee: Voltaix, Incorporated, North Branch, N.J.

[21] Appl. No.: 769,857

[22] Filed: Aug. 26, 1985

Related U.S. Application Data

[63] Continuation of Ser. No. 507,752, Jun. 27, 1983.

[51] Int. Cl.[4] ..................... H01M 10/36; H01M 4/36
[52] U.S. Cl. .................................... 429/218; 429/194; 429/246
[58] Field of Search ............... 429/48, 101, 194, 195, 429/196, 197, 191, 218, 246

[56] References Cited

U.S. PATENT DOCUMENTS

3,993,501 11/1976 Kalnoki-Kis ..................... 429/48
4,440,836 4/1984 Bailey ............................. 429/48

*Primary Examiner*—Donald L. Walton
*Attorney, Agent, or Firm*—Jenner & Block

[57] ABSTRACT

The present invention provides a coating for electrodes for use in electrochemical cells having an electrochemically active species and an electrolyte. The coating includes a selectively permeable material which allows for the diffusion of the active species through the coating during operation of the cell while providing a substantially impervious barrier to the electrolyte. Electrodes utilizing the coatings described herein may be used in primary and secondary cells over a wide range of operating temperatures to deliver better electrochemical performance even at room temperature. Methods of making the coating and an apparatus for performing these methods on a continuous basis are included in the present invention. A novel composition of matter also is contemplated containing lithium, silicon, fluorine prepared by exposing lithium metal to $SiF_4$.

14 Claims, 6 Drawing Figures

COATINGS FOR ELECTROCHEMICAL ELECTRODES AND METHODS OF MAKING THE SAME

RELATED APPLICATIONS

This is a continuation of application Ser. No. 507,752, filed June 27, 1983.

BACKGROUND OF THE INVENTION

The present invention is directed generally to electrochemical cells having an electrolyte and at least one electrode. More particularly, a coating is provided for the electrode which allows for the diffusion of an electrochemically active species through the coating during electrochemical release of the active species from the electrode or deposition of the active species onto the electrode while providing a substantially impervious barrier to the electrolyte. Electrodes utilizing the coatings described herein may be made with various active materials and used in cells over a wide range of operating temperatures to deliver better electrochemical performance compared to the prior art.

In an electrochemical cell, chemical energy is converted to electrical energy with a reduction in the free energy of the system. In the course of the cell reaction, negative charge leaves the anode, travels through the external driven circuit, and re-enters the cell at the cathode. Thus, the cathode is the positive electrode and the anode is the negative electrode. By virtue of the established electromotive series, it is possible to select suitable cathodes and anodes to obtain a desired theoretical voltage. The ideal cell would give the theoretical voltage under continued, constant load and the loss of free energy would manifest itself entirely as electrical energy outside the cell. However, this ideal is never attained in practice, because the internal resistance of the cell is not zero and the reactions within the cell never occur in a completely reversible manner. Moreover, incompatibility of the electrodes with each other or with the electrolyte, polarization, and other well-known problems prevent performance at theoretical values.

In particular, lithium has several properties which prove advantageous when used as an anode. Lithium in equilibrium with lithium ions in various solvent systems affords very negative potentials, and thus it is readily possible to achieve cell voltages greater than three volts, using various oxide cathodic reactants, i.e., $MnO_2$. Because lithium has the lowest equivalent weight of any metal, the high cell voltages result in high energy per unit weight of cell. Lithium is reasonably stable in many nonaqueous electrolyte systems. This stability arises as a consequence of a chemical reaction between the lithium anode and the electrolyte, forming a passivating film at the interface which limits further reaction. Such films cause a number of problems which are discussed below.

Over the past decade, many battery companies and government laboratories have worked on the development of ambient temperature lithium batteries. Several primary lithium cells are now commercially available, although no secondary lithium cells have yet reached this stage.

In the field of primary cells, the Li—$LiAlCl_4$/$SOCl_2$—C system has been extensively investigated. This system has received particular attention because of its relatively high open-circuit voltage of 3.6 volts and high energy density of 500 W-hr/kg. Such lithium primary systems demonstrate very high energy densities. For example, the Li/$SOCl_2$ system exceeds 16–20 Wh/in$^3$, which represents an energy density ten times greater than the Lechanche primary type. In addition to the questionable safety of the cell, however, there are other problems which hinder the ability of these systems to achieve their great potential for commercial success.

Using lithium as an anode material poses significant problems. Although lithium has been used successfully in aqueous electrolytes for very high drain rate batteries in military application, more conventional applications require the use of aprotic solvents to achieve reasonable shelf life and coulombic efficiency at low discharge rates. Use of these solvents causes handling and safety problems for such cells.

Lithium cells using a nonaqueous electrolyte have ruptured during use even though the cells were built to contain the gas generated by the electrochemical reaction between these components. Excessive internal heating, sometimes associated with inadvertent short circuits or over-discharging, is one reported cause of such rupture.

High drain-rate lithium cells have encountered problems with thermal runaway intitiated by the exothermic reaction between lithium and the electrolyte, particularly an aqueous electrolyte. Since lithium has a relatively low melting point and its reactivity greatly increases upon melting, high operating temperatures must be avoided.

Lithium cells with liquid cathodes based on sulfur-containing electrolytes have a particular problem with gas generated from the degradation of the electrolyte. Since the cells are sealed to prevent leakage of the electrolyte, the potential for the cell to rupture is dramatically increased.

Lithium cells operating at ambient temperature using liquid cathodes based on organic or inorganic electrolytes tend to suffer from a shortcoming known as voltage delay. This term describes a temporary voltage depression on load when cells are tested after extended periods of storage, especially at high temperature. This phenomenon results from lithium directly contacting a soluble depolarizer to form a passivating film at the anode surface. The factors controlling this delay in activation are not well understood. The passivation film is at least partially responsible for the chronic low rate capability that nearly all lithium battery systems suffer from.

The voltage delay phenomenon also plagues other types of cells. For example, in a magnesium dry cell a passivation film forms on the magnesium anode to limit corrosion. The cell is then unable to deliver full operating voltage after it is placed under load.

Attempts to solve the voltage delay phenomenon have generally concentrated upon additives to the electrolyte. Although some additives have reduced the effect of the voltage delay phenomenon, the voltage and overall electrochemical performance of the cell is significantly decreased.

An inconvenient and expensive method of avoiding the voltage delay phenomenon is to place a small rechargeable cell i.e. nickel cadmium cell, in parallel circuit with the passivated cell. The rechargeable cell provides the operating voltage until the passivated cell is capable of doing so.

Passivation films often form before the cell is assembled to limit the operating voltage of a cell unless current densities are used above a barrier value. For example, this problem is exhibited by titanium anodes used in electrolytic manganese dioxide processes. Sandblasting and chemical washes are treatments used in the attempt to remove the passivation film before the anode is used in the process.

Anode materials like lithium also are inherently rechargeable, i.e., lithium can be electrodeposited from lithium ion-containing electrolytes. One of the major problems limiting the successful development of rechargeable versions of lithium cells is the nature of the lithium deposit during the recharging of the cells. Past investigations indicate that lithium plating can occur in dendritic form lowering the cell's utilization efficiency and ultimately shorting the cell.

Attempts to prevent deleterious dendrite formation include alloying the lithium with other metals like aluminum. Electrolyte additives also have been used to promote surface alloy formation. Although cycle life of the cell improves, the power density of the cell significantly decreases. Other attempts employ cell separators, such as permeable membranes, to act as physical barriers to dendritic growth. Although cell separators are initially effective, lithium dendrites can eventually penetrate the cell separators and establish transient or permanent electronic shorts.

In order to increase the voltage generated by devices utilizing lithium metal, coatings or layers of lithium compound compositions have been used on the lithium metal contained in these devices. For example, U.S. Pat. No. 3,528,856, granted to Ovshinsky discloses a high temperature voltage and current generating device including a layer of lithium metal which is coated by various lithium compound compositions, i.e., lithium oxide, lithium nitride, etc. The lithium metal, as coated, is useful for generating voltage and/or electrical power in response to the application of heat. Open circuit voltages of the order of 1.5 to 2.5 volts were observed when the device was exposed to high temperature.

An example of a lithium-air device which generates voltage by utilizing lithium compounds as a coating is disclosed in U.S. Pat. No. 3,615,835, granted to Ovshinsky. Various lithium compounds were used as a solid coating over lithium metal. The device operated at room temperature and was activated by exposure to water moisture which penetrated the coating to contact the lithium metal layer.

In accordance with the present invention, primary and secondary electrochemical cells having an electrolyte are fabricated using at least one electrode containing an electrochemically active species such as lithium. A coating is provided on the electrode which is particularly useful because it allows for diffusion of the active species through the coating to the electrolyte upon electrochemical release of the active species from the electrode or deposition of the active species onto the electrode and provides a substantially impervious barrier to the electrolyte.

The electrochemical cells described herein exhibit a wide operating temperature range with improved cell capacity at various discharge rates even at ambient temperatures. Improved rate capability for several cathodic reactants has also been achieved. With improved cell voltage and capacity, the cell is more efficient. In a more efficient cell, there is less power and heat dissipation. Thus, thermal runaway and rupturing of the cell is prevented.

The coating of the present invention provides protection against degradation of the electrode by the electrolyte or during storage and increases the shelf life of the electrode. Cells are less prone to rupture because electrolyte degradation is decreased and less gas is generated during cycling.

SUMMARY OF THE INVENTION

The present invention includes a coating for an electrode for use in an electrochemical cell having an electrochemically active species and an electrolyte. The coating includes a selectively permeable material which allows for the diffusion of the active species through the coating during operation of the cell while providing a substantially impervious barrier to the electrolyte. The problems in prior primary and secondary cells as discussed above are obviated by the present invention, all with improved electrochemical performance of the cells.

The selectively permeable material includes an electrochemically active species and at least one electronegative element. Another component of the coating may be carbon or at least one amphoteric element.

In one embodiment, an electrode for use in an electrochemical cell having an electrochemically active species and an electrolyte includes means for storing said active species and subsequently discharging at least a portion of such stored active species to provide a supply of electrons. The electrode has a surface adapted to be operatively associated with the electrolyte in the cell. The electrode also includes a coating, as described above, on the electrode surface.

In another embodiment, an electrochemical cell is provided which includes an electrochemically active species and anode means for storing the active species and subsequently discharging at least a portion of such stored active species to provide a supply of electrons; the anode means has an operative surface. A coating, as described above, is provided on the surface. The cell further includes cathode means for providing diffusion of the active species between said anode means and said cathode means during operation of the cell. The cathode means operatively contacts the surface through the coating. The cathode means includes an electrolyte. Lithium is one preferred active species. A second preferred active species is hydrogen wherein the electrode includes means for storing hydrogen and subsequently discharging at least a portion of the stored hydrogen to provide a supply of electrons. Other suitable active species include sodium, potassium, magnesium, and calcium. The present invention also contemplates applications of the inventive concept to both primary and secondary cells, and batteries having a plurality of such cells.

A method of making an electrode for use in an electrochemical cell having an electrochemically active species and an electrode includes the steps of providing an electrode having means for storing said active species and subsequently discharging at least a portion of such stored active species to provide a supply of electrons. The electrode includes a surface adapted to be operatively associated with the electrolyte in the cell. The method further includes applying a coating, as described above, to the electrode surface. Preferably, application of the coating to the electrode surface takes place by either solution deposition, vapor deposition, or rapid quench techniques.

The solution techniques include physically coating the selectively permeable material onto the electrode surface, chemically reacting the coating to the electrode surface, and reactively electroplating the coating onto the electrode surface. The vapor deposition techniques include sputtering, reactive sputtering, co-sputtering, reactive co-sputtering, glow deposition, vacuum evaporation, chemical vapor deposition, and reactive chemical vapor deposition. The rapid quench techniques include thermal spraying and plasma spraying.

The present invention also provides an apparatus for performing the methods of making the coated electrodes of the invention on a continuous basis. The electrode is made from a roll of a web of substrate with one or more electrode-forming regions thereon. The apparatus includes means for unrolling the substrate substantially continuously into an application chamber, the chamber including at least one depositing region therein. The apparatus further includes means for depositing a coating onto at least some of said one or more electrode-forming regions. The depositing means is positioned in the application chamber. Preferably, the application chamber may be a solution bath for the solution techniques described above; a reactive chemical vapor deposition chamber; a vacuum chamber for the vapor deposition techniques described above; or, means for melting the selectively permeable material for subsequent depositing and quenching onto a substrate such as with thermal or plasma spraying.

A composition of matter including the elements lithium, fluorine, and silicon also is contemplated by the present invention. The composition of matter exhibits characteristic absorption bands in the infrared region of the spectrum at the frequencies expressed in reciprocal centimeters according to FIG. 5 and the X-ray diffraction spectrum according to FIG. 6. The composition of matter is prepared by exposing lithium metal to a mixture of 18 percent $SiF_4$ in argon at one atmosphere at a temperature of 125° C. Another composition of matter is prepared by exposing potassium or sodium to a mixture of 18 percent $SiF_4$ in argon at one atmosphere at a temperature of 125° C.

DETAILED DESCRIPTION OF THE PREFERRED EMBODIMENTS

Generally, the present invention provides a coating for an electrode which is used in electrochemical cells having an electrochemically active species and an electrolyte. The coating allows diffusion of the active species away from the electrode and into the electrolyte during the discharge stage of the electrochemical reaction. In secondary electrochemical cells, the diffusion of the active species through the coating is reversible. The coating also provides a substantially impervious barrier to the electrolyte. The composition of the coating includes the active species and at least one electronegative element. The coating may also be a compositionally disordered material with single or multiple phases. The coating may be applied through a variety of solution or vapor deposition techniques. Various cathode systems, and more particularly, electrolytes, may be used in an electrochemical cell containing an electrode having the inventive coating. The coating of the invention provide greatly improved specific capacities, cell voltages, rate capabilities, and other electrochemical cell characteristics.

In particular, the coatings of the present invention provide a selectively permeable material which allows an active species to diffuse through the coating during operation of the cell. The term electrochemically active species is used to generally denote the form which the active material of the electrode takes upon electrochemical operation of the the electrode in a cell. Simultaneously, the coating functions as a barrier to prevent diffusion of the electrolyte through the coating so that the electrode does not come in direct physical contact with the electrolyte. Thus, the coating is selectively permeable to the diffusion of the particular active species and impervious to the diffusion of the electrolyte.

The diffusion of the active species need only be in one direction in a primary cell, i.e., from the electrode. The inventive coating may also be used on electrodes in secondary cells. Upon discharge of the electrode, the active species diffuses away from the electrode and into the electrolyte. Upon charging of the electrode, the active species diffuses from the electrolyte to the electrode. Thus, the diffusion of the active species through the coating in a secondary system is reversible.

For prolonged operational life, the coatings of the invention also must be substantially impervious to degradation by the electrolyte. Although the active species diffuses through the coating during the electrochemical reaction, the coating itself does not react with the electrolyte so that the structure of the coating remains intact. Thus, the coating interposes a physical barrier between the electrode and the electrolyte.

The composition of the inventive coating is a selectively permeable material which includes the active species and at least one electronegative element. The term electronegativity refers to the attraction of nuclei for electrons and comparisons between the electronegativity of elements are made with Pauling's electronegativity series. An electronegative element has a Pauling electronegativity value greater than 2.2. Suitable electronegative elements are fluorine, iodine, bromine, chlorine, sulfur, nitrogen, and oxygen. Compounds of these elements also may be suitable. Preferably, a coating of the invention incorporates lithium with either nitrogen or iodine.

The coatings of the present invention may include carbon or at least one amphoteric element. The term amphoteric is used to denote an element with a Pauling electronegativity value ranging between 1.5 and 2.2. Carbon need not be in elemental form; organic compounds such as polymers are suitable. Silicon and aluminum are preferred amphoteric elements. Other suitable amphoteric elements include phosphorus, boron, gallium, arsenic and zinc. The amphoteric element need not necessarily be in elemental form, and thus, compounds of these elements also may be used.

Preferably, a coating of the invention incorporates fluorine as the electronegative element, lithium as the active species, and silicon as the amphoteric element.

The coating also may contain an electropositive element incorporated in the selectively permeable material. An electropositive element has a Pauling electronegativity value less than 1.5. The electropositive element is a different element from the active species. Suitable electropositive elements include lithium, sodium, potassium, magnesium and calcium. Adding an electropositive element increases the ionic diffusion rate of the active species through the coating. Other means for increasing the diffusion rate of the active species through the coating are also contemplated.

To enhance the electrochemical characteristics of the electrode, the diffusion coefficient of the active species through the coating is preferably greater than about $10^{-10}$ cm$^2$/sec. More importantly, the coatings of the invention preferably have an ionic conductivity greater than about $10^{-6}$ ohm$^{-1}$ cm$^{-1}$.

The coating of the invention may have a structure which is either a single phase crystalline material, or a compositionally disordered material. Such disordered materials have tailor made local chemical environments which are designed to improve the electrochemical performance of a coated electrode by increasing the density and/or reducing the barrier height of the diffusivity sites for the active species of the electrode. The diffusivity sites must be selective, so that the electrolyte will not be diffused through the coating.

Disordered materials are ideally suited for manipulation since they are not constrained by the symmetry of a single phase crystalline lattice or by stoichiometry. By moving away from materials having such restrictive single phase crystalline symmetry, it is possible to accomplish a significant alteration of the local structural chemical environments to selectively enhance and control the active species diffusion coefficient of the inventive materials.

The types of disordered structures which provide the local structural chemical environments for the enhanced selective diffusion characteristics contemplated by the invention include multicomponent polycrystalline materials lacking long-range compositional order, microcrystalline materials, amorphous materials or multiphase materials containing both amorphous and crystalline phases. The following list provides a classification of the spectrum of disordered structures described by the present invention:

1. Multicomponent polycrystalline materials lacking long-range compositional order.
2. Microcrystalline materials.
3. Mixtures of polycrystalline and microcrystalline phases.
4. Mixtures of polycrystalline or microcrystalline and amorphous phases.
5. Amorphous materials containing one or more amorphous phases.

In carrying the present invention into practice, the coatings described herein may be used on the surface of an electrode adapted to be operatively associated with an electrolyte in an electrochemical cell. The coated electrode may include the active species as part of the coating before operation of the cell diffuses the active species through the coating.

The electrode includes means, described below, for storing the active species and subsequently discharging at least a portion of the stored active species to provide a supply of electrons. The electrode may initially be in a charged or uncharged state. In a charged state, the active species is initially stored with the coated electrode. In an uncharged state, the active species is initially released from a counter electrode or from the electrolyte upon operation of the cell and diffuses through the coating to deposit onto the coated electrode.

The active material of an electrode that can be used with the coatings of the present invention includes at least one element selected from the group consisting of Group IA, Group IB, Group IIA, Group IIB, and mixtures of the aforesaid elements with other substances such that the aforesaid elements can be electrochemically released from the mixture. Preferably, the active material of the electrode is the metal lithium. Advantageously, other Group IA elements such as sodium, and potassium are suitable. Suitable Group IIA elements are magnesium and calcium. A second preferred active material is a hydrogen storage material; other means for charging by absorbing and storing hydrogen and subsequently discharging at least a portion of the stored hydrogen to provide a supply of electrons also are contemplated.

The electrode also may consist entirely of the active material or the active material can be deposited on a supporting structure which, in turn, can be constructed of materials such as copper, steel, nickel, carbon, etc., which are advantageously electronically conductive but which are not the source of the active species. In some instances, the electrode may incorporate alloys, compounds or solutions containing the active material provided that the alloys, compounds or solutions meet the requirement that they are electronically conductive and are capable of electrochemically releasing the active species which is to be transported into the electrolyte.

A general concept of the invention is to substitute a designed barrier with the characteristics described herein in place of the passivation layer spontaneously formed by the reaction of the electrode and the electrolyte or environment which deleteriously affects many electrode systems. As applied to the electrode, the coating should be of an effective thickness and uniformity to reduce or prevent the formation of a passivation layer on the electrode surface which limits the electrochemical release of the active species.

The coating should be uniform so that areas of the electrode surface are not exposed directly to the electrolyte. Otherwise a passivation layer may form over such uncoated areas and decrease the electrochemical performance of the electrode. Furthermore, direct contact between the electrolyte and electrode provides an area for degradation of the electrode.

The thickness of the coating must be sufficient to act as a substantially impervious barrier to the diffusion of the electrolyte to the electrode. The invention contemplates, but it not limited to, a coating with a thickness not less than about 100 Å and not more than about 100,000 Å. Advantageously, the thickness of the coating is not less than about 500 Å and not more than about 10,000 Å. Preferably, the thickness of the coating is about 1000 Å. The coating preferably has ionic conductivity greater than $10^{-6}$ ohm$^{-1}$ cm$^{-1}$ and/or a diffusion coefficient greater than $10^{-10}$ cm$^2$/sec.

The coated electrode described above may be used as anode means in an electrochemical cell. Such anode means store the active species and subsequently discharge at least a portion of the stored active species to provide a supply of electrons. The anode means include an operative surface for the coating.

Using the coated electrode in an electrochemical cell requires cathode means for providing diffusion of the active species between the anode means and the cathode means during operation of the cell. The cathode means operatively contacts the surface through the coating. The present invention is not limited to a particular structure nor material used for the cathode means.

The cathode structure itself need not necessarily consist of a cathodic reactant. The structure may be made of materials such as carbon, copper, nickel, zinc, silver, etc., upon which or in which the cathodic reactant is deposited or impregnated. Advantageously, the cathode structure consists entirely of the cathodic reactant when it displays significant electrical conductivity. Preferably, the cathodic reactant is not admixed or diluted with an electrochemically inactive material.

The cathodic reactant may itself be dissolved or suspended directly in the electrolyte. In these embodiments, the structure of the cathode means is a current collector spaced from the anode. Often, the use of a separator is unnecessary when the electrolyte itself functions as a separator.

The cathode means includes any type or kind of cathodic reactant. The cathodic reactant may be a pure compound or any combination of compounds; a liquid or solid; and used with a liquid or solid electrolyte. Preferably, the cathodic reactants used with a lithium anode coated by the invention include: $FeS_2$, $TiS_2$, $(CF_x)_m$, and $SOCl_2$. Other suitable cathodic reactants include, but are not limited to: $MnO_2$, $MoO_3$, $V_6O_{13}$, $V_2O_5$, $CuO$, $Ag_2CrO_4$, $CuS$, $SO_2$, $SO_2Cl_2$, $I_2 Br_2$, $PbI_2$, $PbS$, and $S$.

An electrolyte useful in practicing the present invention must be chemically impervious to the inventive coating and cathode materials. The electrolyte must permit migration of ions from the coated anode to the cathodic reactants during the discharge of a primary or secondary cell, and vice versa, during the charge cycle of a secondary cell. The term electrolyte as used in the application herein refers individually to either an ionic conductive component or a solvent or the combination of both.

Suitable electrolytes include both aqueous and nonaqueous, alkaline and acidic, organic and inorganic materials. A wide range of aprotic solvents and their mixtures can be used as nonaqueous electrolytes with the above-described anodes. Preferably, these nonaqueous solvents include dioxolane, dimethyl formamide, methyl formate, and propylene carbonate. Other suitable solvents include water, butyrolactone, dimethoxyethane, ethylene carbonate, sulfolane, and tetrahydrofuran.

Other suitable electrolytes include an ionizable salt having at least one cation moiety selected from the group of elements previously listed above and at least one anionic moiety selected from the group consisting of halides, hydroxides, sulfates, nitrates, fluoroarsenates, borofluorides, borochlorides, phosphofluorides, thiocyanates, and perchlorates.

For use with a lithium anode, preferred electrolytes include salts of lithium perchlorate, lithium tetrafluoroborate, lithium aluminum tetrachloride, and lithium hexafluoroarsenate.

The concentration of the salt in the electrolyte is determined by the electrolyte conductivity and chemical reactivity. However, in most instances, concentrations between about 0.1 moles per liter and 5 moles per liter of the ionizable salt in the solvent are preferred. In addition to the foregoing electrolytes, it should be noted that some electrolytes may be used in the pure state as in the form of a solid.

The present invention contemplates several methods of applying the coating to the electrode surface described herein. These methods may be used to successively deposit several layers of the coating. Coatings of the selectively permeable material described above may be formed by atomistic, molecular, particulate, or bulk deposition techniques. Although particulate and bulk techniques are often inexpensive by comparison, atomistic or molecular deposition techniques allow for greater control over the local chemical environments to structure a selectively permeable material with the characteristics described above. Generally, three classes of methods for applying the coating can be described. This classification, however, is presented to better understand the contemplated invention and is not meant to be a limitation. These classes are solution deposition, vapor deposition and rapid quench deposition. As used in the following discussion, the term selectively permeable material refers generally to some or all of the individual elements, compounds, or components comprising the coating.

The first class of methods for applying the coating to an electrode surface includes preparing a solution of a solute and the selectively permeable material. This solution is applied to the electrode surface. The selectively permeable material is then deposited onto the electrode surface to form the coating.

The step of depositing the selectively permeable material onto the electrode surface may be done with or without an electrical bias. In one embodiment, the solute may be dried from the solution to leave the selectively permeable material as a coating on the electrode surface. In a second embodiment, subjecting the electrode to an electrical bias plates certain components of the selectively permeable material onto the electrode surface where they may react. Thus, the coating is reactively electroplated. In a third embodiment, the certain components of selectively permeable material chemically react with the electrode surface to form the coating.

The first class of methods for applying the coating also includes adding the selectively permeable material directly to the electrolyte contained in the electrochemical cell with the electrode. Once the electrode surface is placed in operative contact with the electrolyte, the selectively permeable material reactively deposits onto the electrode surface to form the coating. The deposition of the selectively permeable material onto the electrode surface once it is placed in operative contact with the electrolyte may take place by either a chemical reaction between the selectively permeable material and the electrode surface; or by plating certain components of the selectively permeable material onto the electrode surface by subjecting the electrode to an electrical bias so as to reactively electroplate the coating.

A second class of methods of applying the coating to the electrode can be generally defined as vapor deposition. The depositing of the selectively permeable material is accomplished by a number of conventional techniques which are carried out in a vapor environment. These techniques include sputtering, reactive sputtering, co-sputtering, reactive co-sputtering, glow discharge, vacuum evaporation, chemical vapor deposition, and reactive chemical vapor deposition.

A third class of methods of applying the coating to the electrode includes rapid quench techniques where the selectively permeable material is melted and deposited onto the electrode surface. As the selectively permeable material is deposited, it is rapidly quenched. A compositionally disordered material may be formed. Preferably, thermal or plasma spraying is used.

The methods of preparing the coatings described herein include reactively electroplating and reactive chemical vapor deposition. It is believed that such reactions are advantageously promoted by using the high mobility of the active species in the coating. Thus, the active species is diffused through the coating during its formation to react with other components of the selectively permeable material at the interface between the growing coating and solution.

Figure 1:
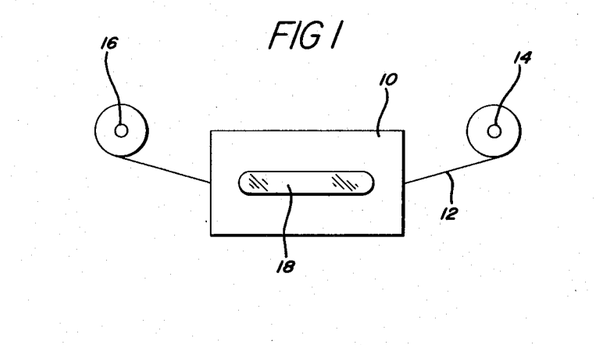
FIG. 1 is a block diagram of one illustrative apparatus for performing the methods of making the coated electrodes of the invention on a continuous basis.

Referring to FIG. 1, a block diagram of a system apparatus is illustrated for making coated electrodes of the invention, as described above. Although these processes could be performed on a batch basis, continuous processing is preferred. Thus, the vapor deposition, solution deposition, and rapid quench processes described above may be performed in an application chamber 10. A roll of a web of substrate material 12 is fed off of a payout reel 14 into and through the chamber 10 where the coating is deposited onto at least some of the one or more electrode-forming regions on the substrate 12. After the electrode-forming regions have been coated, the web moves to a take-up reel 16. The deposition process may be observed through a viewing port 18 or through monitoring and control instrumentation.

Other means may be provided for unrolling the substrate substantially continously into the application chamber 10. At least one depositing region is located in the application chamber 10.

The means for depositing said selectively permeable material may include filling the application chamber 10 with a solution to operatively contact the electrode-forming regions as the substrate 12 moves through the chamber 10. The solution includes some or all of the components of the selectively permeable material and a solute. If all of the components are present in the solute, then the coating may be deposited on said electrode-forming regions by providing means for drying the solute from the solution. In a second embodiment, means for subjecting the electrode-forming regions to an electrical bias may plate certain components of the selectively permeable material onto the substrate 12 where they react with the active species on the surface of the electrode so as to reactively electroplate the coating. In a preferred third embodiment, means are provided for chemically reacting dissolved components of the selectively permeable material with the active species at the electrode surface to form the coating.

The application chamber 10 may also be evacuated so that the means for depositing the selectively permeable material on the electrode-forming regions may include vapor deposition methods. The vapor deposition techniques contemplated by the invention are referred to by those skilled in the art as: sputtering, reactive sputtering, co-sputtering, reactive co-sputtering, glow discharge, vacuum evaporation, chemical vapor deposition, and reactive chemical vapor deposition.

The means for depositing said selectively permeable material on said electrode-forming regions may also include means for melting the selectively permeable material, means for depositing the selectively permeable material onto the electrode-forming regions, and means for quenching the selectively permeable material. Thus, the substrate 12 and application chamber 10 can be used in a fashion similar to a thermal or plasma spraying apparatus.

EXAMPLE I

Comparative tests were made between cells using coated lithium anodes of the invention and conventional, uncoated lithium anodes. A coating was prepared on a scraped lithium foil mechanically positioned on an anode platen by reactively co-sputtering an alloy of lithium and silicon (about 50 weight percent of each) in an atmosphere of about 2% fluorine/98% argon using a Mathis R. F. Sputtering Unit. The anode platen was cooled by a liquid nitrogen bath during the sputtering. The lithium foil was supplied by Foote Mineral Company and was 99.9% pure. The area and thickness of the foil were about 0.1875 sq. in. and 0.10 in., respectively. The thickness of the coating on the anode was about 1000Å.

A cathode for the cell was made with about 100 mg. of finely ground natural iron pyrite or ($FeS_2$). Twenty percent XC-72 carbon from the Cabot Corporation and 3% dry powdered Teflon were blended with the $FeS_2$ powder. The mix was pressed at about 1,200 psi into a nickel grid with tabs for electrical contact. The cathode formed was then cured at 190° C. to bond the mix. The active materials were balanced in such a way that a stoichiometric excess of lithium was present compared to the discharge capacity of the $FeS_2$.

Filter paper was used as a separator in the cell. The cell was assembled with the separator sandwiched between the anode and cathode. The electrolyte, 1M $LiClO_4$ in 1, 3 dioxolane, was added and the test cell mounted in a glass test vessel equipped with a standard taper joint and with glass to metal throughputs for electrical contact.

A second cell was constructed in an identical manner as described above, except that the anode was conventional, uncoated lithium foil.

Figure 2:
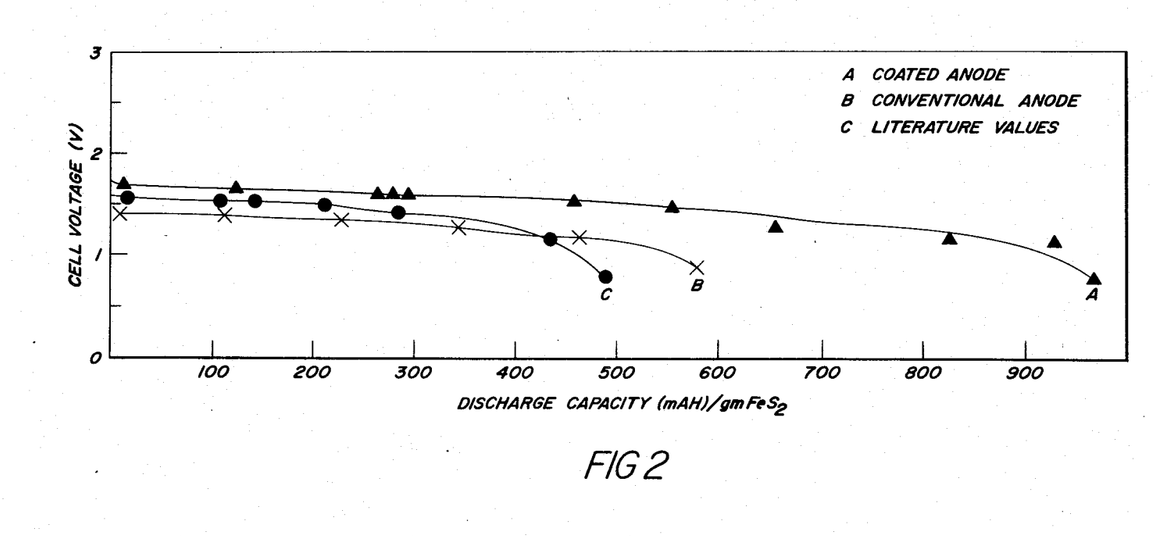
FIG. 2 is a graph of cell voltage vs. capacity for a cell having a coated electrode of the invention compared to conventional, uncoated electrodes of the prior art.

FIG. 2 compares the test results from these two cells, plotting cell voltage vs. discharge capacity at room temperature. A third set of data, published in the article entitled "Ambient Temperature Secondary Li/$FeS_2$ Cells" Advanced Secondary Batteries Session, pp. 201-204, by Newman et al., also is presented in FIG. 2 for comparison. The third set of data is for a cell constructed in a similar manner as described above, except that a conventional, uncoated lithium anode is used with $LiB(C_6H_5)_4$-dioxolanedimethoxyethane as the electrolyte.

The data clearly demonstrate that the cell capacity nearly doubled. The theoretical capacity of the cell was calculated at about 880–900 mAh/g of $FeS_2$. The capacity of the cell achieved using the coated anode was close to the theoretical capacity thus indicating much more effective utilization of the active materials. The open circuit voltage also was considerably improved over the conventional, uncoated anodes.

EXAMPLE II

A comparison of cells was made using a lithium anode coated in accordance with the present invention against a conventional, uncoated lithium in various electrolytes. Two cells were prepared as described in Example I, except for using a different electrolyte. Two additional cells were prepared as described in Example I, except that a lithium aluminum alloy (50 percent by weight) was used as the substrate foil. The following table presents the highest discharge capacity for each cell tested:

TABLE I

|  | Discharge Capacity (mAh/g) | | | |
| --- | --- | --- | --- | --- |
|  | Coated Anode | | Conventional Anode | |
| Electrolyte | Li | LiAl | Li | LiAl |
| $LClO_4$ in dioxolane | 967 | 884 | 492 | 178 |
| $LiAsF_6$ in MeTHF | 227 | | 185 | |

As demonstrated by these results, the coating of the present invention consistently and dramatically increases the capacity of the cells, irrespective of which electrolyte or anode composition is used.

EXAMPLE III

A comparison of rechargeable cells was made using a lithium anode prepared with a coating of the present invention and a conventional, uncoated lithium anode. Two cells were constructed identical to the cells described in Example I, except that $TiS_2$ was used instead of $FeS_2$ for the cathodic reactant. The following table presents the discharge capacity for the first three cycles of each cell:

TABLE II

|  | Cycle Discharge Capacity mAh/g | | |
| --- | --- | --- | --- |
|  | 1 | 2 | 3 |
| Coated Anode | 125.4 | 93.1 | 88.5 |
| Conventional Anode | 91.7 | 72 | |

These results demonstrate that the present invention improves the cycling efficiency of the cells. Nearly two-thirds of the initial cell capacity was rechargeable.

EXAMPLE IV

Comparative tests were made between cells using coated lithium anodes of the invention and conventional uncoated lithium anodes in an $SOCl_2$ electrolyte. One cell contained a coated lithium anode prepared in a manner described in Example I. The area and thickness of the foil was about 0.60 square inches and 0.10 inches, respectively. The thickness of the coating on the anode was about 1000 Å. A cathode for the cell was made with XC-72 carbon from the Cabot Corporation and 3% dry powdered teflon. The mix was pressed at about 1200 psi into a nickel grid with tabs for electrical contact. The cathode formed was then cured at 100° C. to bond the mix.

Filter paper was used as a separator in the cell. The electrolyte, 1.8M $LiAlCl_4$-$SOCl_2$ was obtained from the Lithium Corporation of America and added to the test cell.

A second cell was constructed in an identical manner as described above, except that the anode was a conventional uncoated lithium foil.

Figure 3:
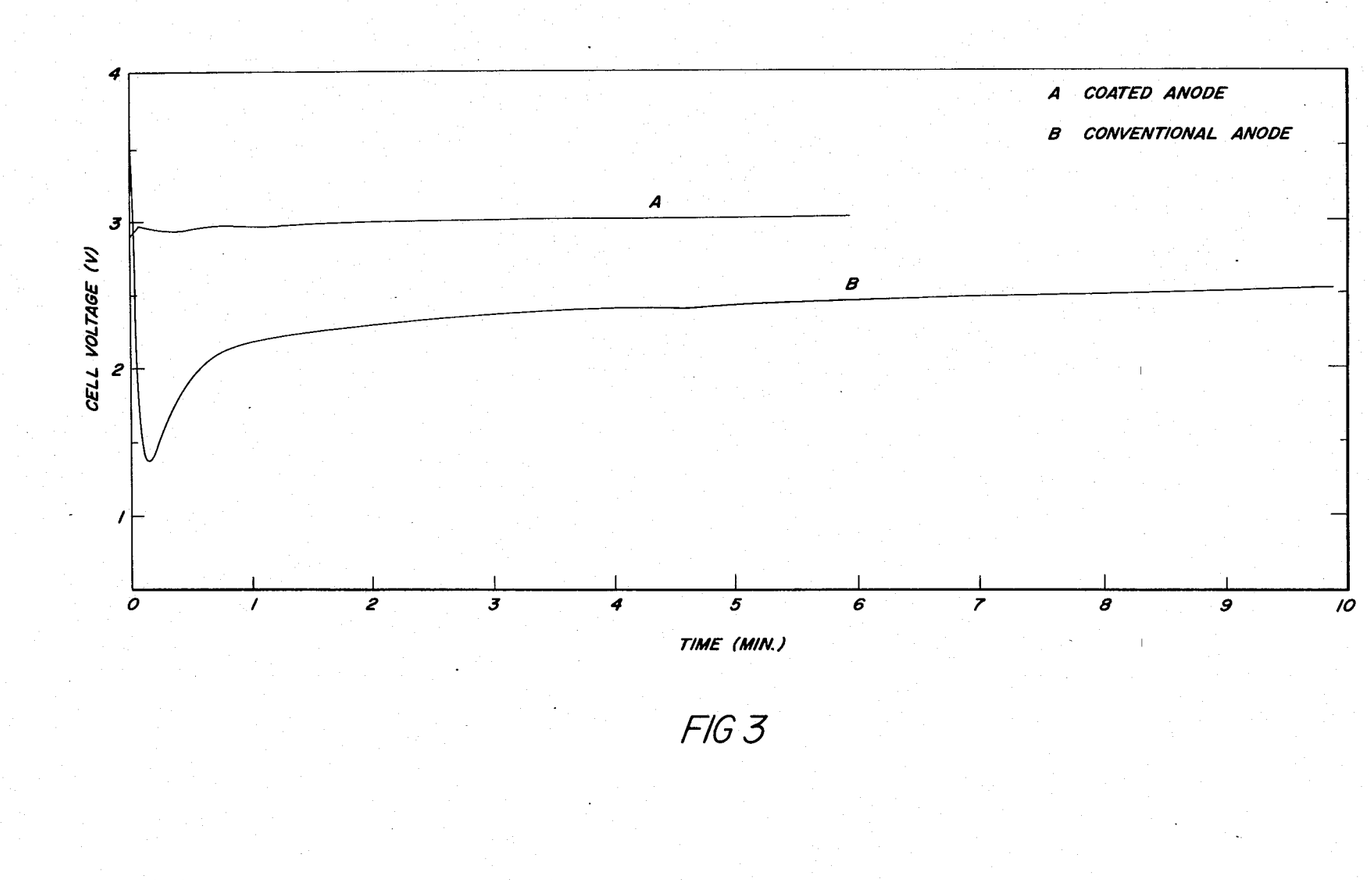
FIG. 3 is a discharge curve plotting cell voltage vs. time for a coated lithium anode of the invention in $SOCl_2$ electrolyte compared to a conventional, uncoated anode of the prior art demonstrating the elimination of the voltage delay phenomenon.

FIG. 3 compares the discharge of each cell at 20 mA. As the data clearly demonstrate, the voltage delay phenomena is eliminated by using the lithium anode coated with the present invention. This is accomplished with an improvement in operating voltage at the same drain rate.

EXAMPLE V

Lithium foil supplied by Foote Mineral (99.9% pure) reacted with 18% $SiF_4$ gas mixed with argon in a sealed glass container at slightly less than one atm. total pressure. At 125° C. the lithium foil immediately started reacting gently and turned black in color, forming a coating within about 5 minutes.

Figure 4:
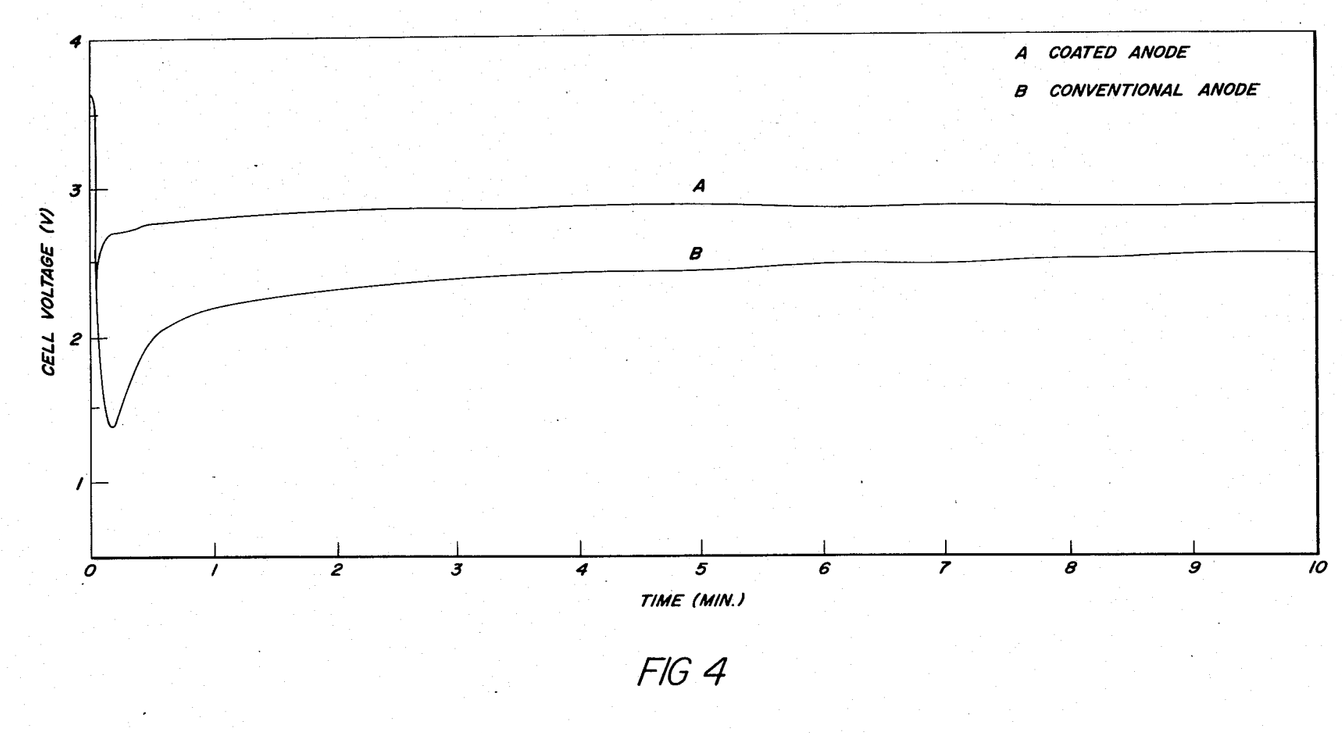
FIG. 4 is a discharge curve plotting cell voltage vs. time for a coated lithium anode of the invention made by a reactive chemical vapor deposition technique compared to a conventional, uncoated anode of the prior art.

FIG. 4 compares the discharge at 20 mA. of a conventional, uncoated lithium anode with the anode described above. The data illustrate the improved electrochemical performance of the cell having the inventive coating made by the reactive chemical vapor deposition technique.

Figure 5:
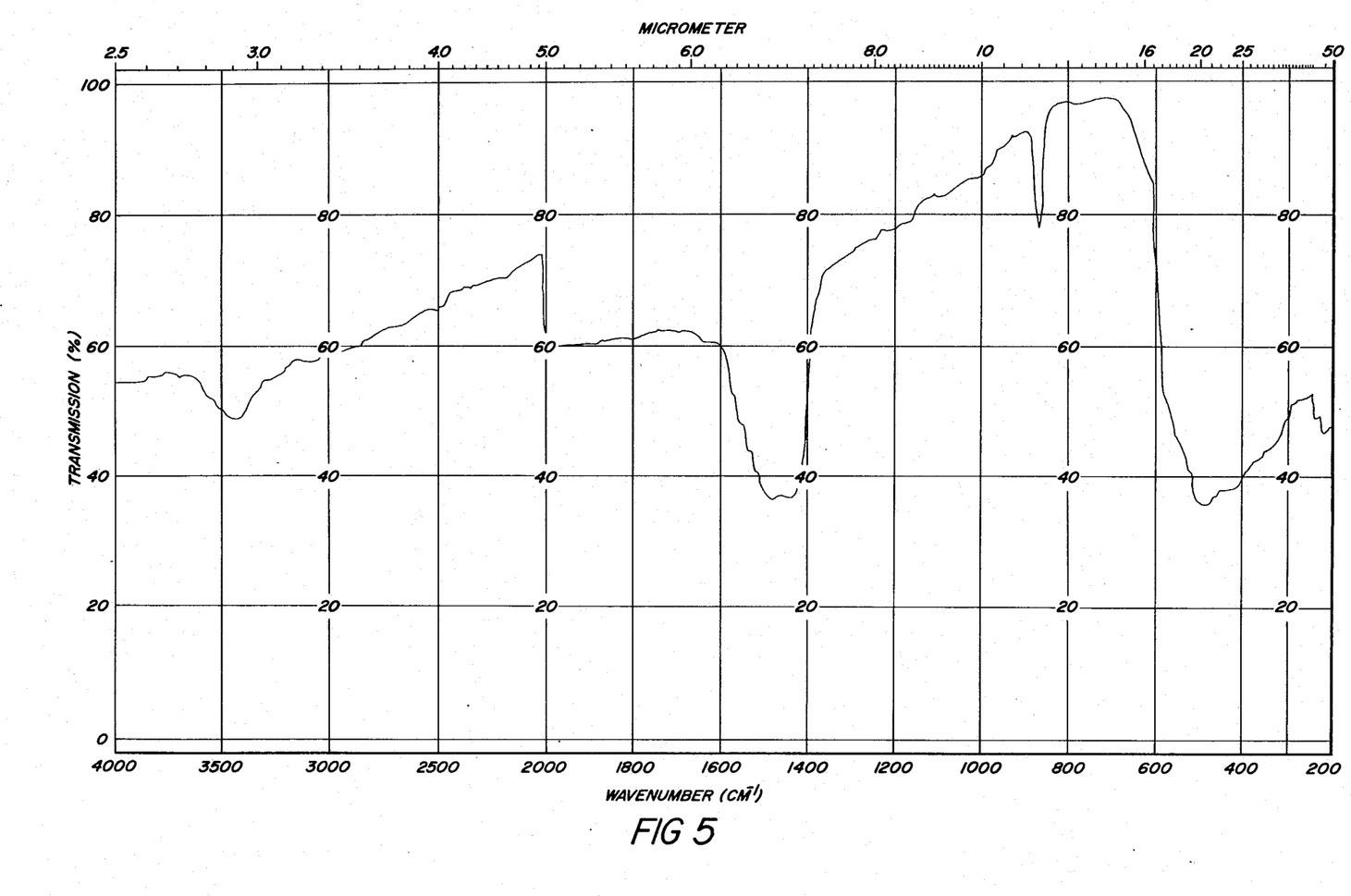
FIG. 5 presents the infrared spectrum for a coating of the present invention formed by the reaction of lithium metal and $SiF_4$.
Figure 6:
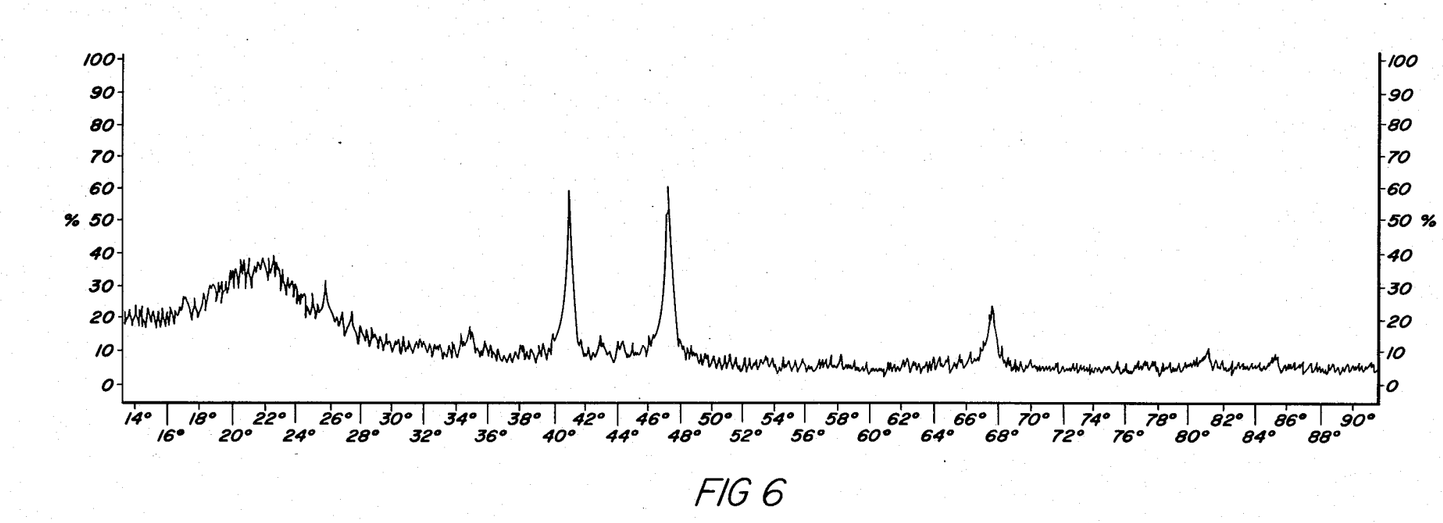
FIG. 6 presents the X-ray diffraction spectrum of a coating of the present invention formed by the reaction of lithium metal and $SiF_4$.

The infrared spectrum of the resultant coating appears as FIG. 5 and does not agree with the infrared spectra of $Li_2SiF_6$, $SiF_4$, and $Na_2SiF_6$ presented in the literature. The sample was prepared with finely ground KBr as a pressed pellet. The X-ray diffraction spectrum of the coating on a glass substrate appears as FIG. 6 and does not agree with the X-ray diffraction spectra of the above-identified reference compounds found in the literature.

As illustrated by these examples, a number of advantages result from substituting a designed coating for the passivating layer otherwise formed on electrodes. The coatings of the invention allow for diffusion of the active species through the coating to the electrolyte upon electrochemical release of the active species from the electrode. Simultaneously, the coating provides a substantially impervious barrier to the electrolyte. Because the electrolyte can neither diffuse through the coating nor degrade the coating to come in direct contact with the electrode, a passivation layer is not formed directly on the electrode. The phenomena of voltage delay is completely eliminated without deleterious consequences to the electrochemical performance of the cell. In fact, the electrochemical cells described herein exhibit a wide operating temperature range with improved cell capacity at various discharge rates.

Improved rate capability for several cathodic reactants has also been achieved by the invention. Improved cell voltage and capacity demonstate greater electrochemical efficiency with a concomitant reduction in internal heat generation. Furthermore, the coatings provide long shelf lives for the electrodes because they are protected against degradation by the electrolyte.

Secondary cells embodying the inventive concept described herein demonstrate an improved rechargeability and decreased dendrite formation. The invention avoids excessive solvent degradation. Consequently, less gassing was observed during cycling of the cells. This provides a safer environment because the cells are less prone to rupture because of pressure buildup. All of the advantages described herein have been achieved without rigorous purification of the electrolyte. Thus, cells produced in accordance with the invention are less expensive and easier to manufacture.

Modifications and variations of the present invention are possible in light of the above teachings. It is, therefore, to be understood that within the scope of the appended claims the invention may be practiced otherwise than as specifically described.

What is claimed is:

1. A coated electrode which is capable of electrochemically releasing an active species to an electrolyte in an electrochemical cell, said electrode comprising:
    an electrode body comprising active material for storing said active species and subsequently discharging at least a portion of such stored active species to provide a supply of electrons; and
    a non-metallic, inorganic coating for reducing passivation of said electrode, said coating consisting essentially of lithium, silicon and fluorine.

2. The coated electrode of claim 1, wherein the ionic conductivity of said coating is greater than about $10^{-6}$ $ohm^{-1} cm^{-1}$.

3. The coated electrode of claim 1, wherein the diffusion coefficient of said active species through said coating is greater than about $10^{-10}$ $cm^2/sec$.

4. The coated electrode of claim 1, wherein said permeable material further consists essentially of at least one amphoteric element in addition to silicon.

5. The electrode of claim 1 wherein said coating is compositionally disordered.

6. The electrode of claim 1 wherein said coating is amorphous.

7. A coated lithium anode for use in an electrochemical cell having an electrolyte, said anode comprising:
    an anode body of lithium or an alloy thereof having an anode surface adapted to be operatively associated with said electrolyte in the cell; and
    a non-metallic, inorganic coating on said lithium anode surface for reducing passivation of said anode, said coating consisting essentially of lithium, silicon and fluorine.

8. The coated anode of claim 7, wherein the ionic conductivity of said coating is greater than about $10^{-6}$ $ohm^{-1} cm^{-1}$.

9. The coated anode of claim 7, wherein the diffusion coefficient of said lithium through said coating is greater than about $10^{-10}$ $cm^2/sec$.

10. The electrode of claim 7 wherein said coating is compositionally disordered.

11. The electrode of claim 7 wherein said coating is amorphous.

12. An electrochemical cell comprising:
    an electrochemically active species, said active species selected from a group consisting of lithium, sodium, and calcium;
    an anode for storing said active species and subsequently discharging at least a portion of such stored active species to provide a supply of electrons, said anode having an anode surface;
    a non-metallic, inorganic coating on said anode surface for reducing passivation thereof, said coating consisting essentially of lithium, silicon and fluorine and
    a cathode for providing diffusion of said active species between said anode and said cathode during operation of the cell, said cathode operatively contacting said anode surface through said coating, said cathode comprising a cathodic reactant for said anode.

13. The electrochemical cell of claim 12 wherein said coating on said anode is compositionally disordered.

14. The electrochemical cell of claim 12 wherein said coating on said anode is amorphous.

* * * * *

UNITED STATES PATENT AND TRADEMARK OFFICE
CERTIFICATE OF CORRECTION

PATENT NO. : 4,624,902

DATED : November 25, 1986

INVENTOR(S) : John P. deNeufville et al.

It is certified that error appears in the above-identified patent and that said Letters Patent is hereby corrected as shown below:

In the Abstract, line 16, after "con," insert --and--.

In column 6, line 21, delete "coating", second occurence, and insert therefor --coatings--.

In column 6, line 32, delete "the", first occurrence.

In column 9, line 2, delete "it" and insert therefor --is--.

In column 12, line 39, delete "or" and insert therefor --ore--.

In column 13, line 26, delete "LClO$_4$" and insert therefor --LiClO$_4$--.

In column 14, line 56, delete "demonstate" and insert therefor --demonstrate--.

In Claim 12, column 16, lines 25 and 26, after "fluorine" insert --;--.

Signed and Sealed this

Twenty-seventh Day of October, 1987

Attest:

DONALD J. QUIGG

Attesting Officer

Commissioner of Patents and Trademarks